United States Patent [19]

Helmuth

[11] Patent Number: 5,245,781
[45] Date of Patent: Sep. 21, 1993

[54] HELICAL SPINNER FISHING LURE

[76] Inventor: Jeffrey B. Helmuth, 559 Cairo Jct. Rd., Catskill, N.Y. 12414

[21] Appl. No.: 821,560

[22] Filed: Jan. 15, 1992

[51] Int. Cl.⁵ ............................................. A01K 85/00
[52] U.S. Cl. ................................. 43/42.2; 43/42.16; 43/42.19
[58] Field of Search ............... 43/42.16, 42.19, 42.2, 43/42.12, 42.36

[56] References Cited

U.S. PATENT DOCUMENTS

| | | | |
|---|---|---|---|
| 1,530,343 | 3/1925 | Bayer | 43/42.16 |
| 1,617,318 | 2/1927 | Brown | 43/42.2 |
| 1,871,971 | 8/1932 | Eppich | 43/42.2 |
| 1,967,089 | 7/1934 | Hick | 43/42.16 |
| 2,086,008 | 7/1937 | Turner | 43/42.2 |
| 2,493,431 | 1/1950 | Wold | 43/42.2 |
| 2,497,807 | 2/1950 | Wood | 43/42.2 |
| 2,598,965 | 6/1952 | Bain | 43/42.2 |
| 3,357,123 | 12/1967 | Kurlovich | 43/42.2 |
| 4,099,343 | 7/1978 | Enz | 43/42.19 |
| 4,637,158 | 1/1987 | Reid | 43/42.19 |

Primary Examiner—Kurt C. Rowan

[57] ABSTRACT

The present disclosure is directed to a spinning fish lure having a rigid plastic helical shaped spinner body mounted on a braided strand wire lanyard about which is the axis of rotation. The helical spinner body is disposed on the wire lanyard through hubs in the body proper coincident on the longitudinal centerline of the helix pattern. The spinning body bears on a bead displacably mounted on the lanyard. The lanyard provides a line connection at the fore end and has a hook connected at the aft end.

4 Claims, 1 Drawing Sheet

HELICAL SPINNER FISHING LURE

BACKGROUND OF THE INVENTION

1. Field of the Invention

The present invention is directed to the fishing lure art and more particularly to the spinning lure species of this art. A commercially available braided strand stainless steel wire rigging connectable to a fishing line is provided around which a spinner body in the form of a helix is freely rotatable. Further, the spinner body is fabricated of solid plastic, the specific gravity of which is approximately 1.150+/− and being pigmented any one or combination of the colors of the spectrum; either transparent, translucent, or opaque.

2. Description of Prior Art

The present invention is directed to the fishing lure art of the spinning lure type wherein the closest art known to me at the time of this writing is U.S. Pat. No. 4,637,148 to Reid of 1987; U.S. Pat. No. 4,099,343 to Enz of 1978; U.S. Pat. No. 2,598,965 to Bain of 1952; U.S. Pat. No. 2,497,807 to Wood of 1950; U.S. Pat. No. 2,493,431 to Wold of 1950; U.S. Pat. No. 2,086,008 to Turner of 1937; U.S. Pat. No. 1,967,089 to Hick of 1934; U.S. Pat. No. 1,871,971 to Eppich of 1932; U.S. Pat. No. 1,617,318 to Brown of 1927; and U.S. Pat. No. 1,530,343 to Bayer of 1925.

SUMMARY OF THE INVENTION

The present invention is directed to a fishing lure having an opaque, translucent, or transparent plastic spinner body pigmented any one or combination of the colors of the spectrum and comprising a helix configuration, the fore and aft ends of which are hubbed onto and coincident with the longitudinal centerline, in order to receive a cable rigging axis. The spinner body is mounted upon a braided strand stainless steel cable rigging about which is the axis of rotation. The rigging cable is the lanyard of the lure as a whole. The assembly consists of the following components; at the terminal end is attached a plain or decorated treble hook, successively, a glass bead is displacably mounted on the lanyard as a bearing, then the spinner body, and lastly a loop is provided at the fore end unto which the fishing line is tied; thus providing a complete lure assembly in and of itself. A modification of the lure is the addition of a bullet weight onto the lanyard displacably mounted between the hook and the bearing bead. All components of the assembly, except the hook, are freely displaceable on the wire axis.

Specifically, the spinner body is sinistrorse, that is, if the lure is held vertically, the form of the body rises helically from left to right, as seen from outside the helix. (opposed to dextrorse) The spinning body gyrates counterclockwise during the retrieve of the lure.

The unweighted lure, at a slightly faster than normal retrieve will cause the lure to rise to the surface of the water and disturb and splash the water thereby attracting game fish thereto. This same lure will sink vertically with no tension on the line causing the spinner body to rotate in the opposite direction until again reversed upon further retrieve. The unweighted lure assembly slowly sinks in fresh quiescent water. The additionally weighted lure assembly is for use in salt water or water with a swift current.

As a result of water forces upon retrieve of the cast or in trolling, the helical body revolves around the wire lanyard. The resulting effect simulates the swimming action of injured bait fish. Also, hydrodynamic waves are created which are detectable by the lateral line of the game fish. Inasmuch as the spinner body offers slight resistance in tension upon retrieve of the cast, the angler can feel even the slightest strike and set the hook at the best possible moment. Also, because of this feature, the lure will not accidently pull out of a down-rigger clip. Furthermore, line twist is reduced because the spinner body rotates around the wire lanyard with minimal friction produced between the hubs and the wire lanyard, the hook acting as a keel to retain the wire lanyard rotationally stationary with respect to the spinner body.

Because the spinner body is freely displacable on the wire lanyard and the hook is swivelly mounted to the aft loop, trophy fish cannot use the body of the lure as leverage to pry the hook out of their mouths, resulting in less lost fish. Complimenting this feature is the fact that the braided stainless steel lanyard is relatively more flexible than typical spinner shafts of the art known to me, additionally resulting in even less leverage.

The braided stainless steel lanyard is an integral part of the lure, therefore, no seperate leader is required as terminal tackle to protect against the sharp teeth and gill plates of the game fish, as the wire lanyard is of sufficient length to serve that purpose.

It shall be further understood that the pigmented transparent plastic body captures light and the edge or narrow dimension of the spinner body glows with a greater intensity than the ambient light. This gives a plurality of light reflections and refractions through the water thereby attracting game fish thereto. Alternatively, metalic glitter can be molded directly into the plastic spinner body giving a similar effect.

Owing to the fact that the helical spinner body is fashioned out of plastic, the body will not corrode or rust.

BRIEF DESCRIPTION OF THE DRAWING

Various objectives and advantages of the invention will hereinafter become more fully apparent from the following description of the drawing, illustrating a presently preferred embodiment thereof, and wherein.

DESCRIPTION OF THE PREFERRED EMBODIMENTS

Figure 1:
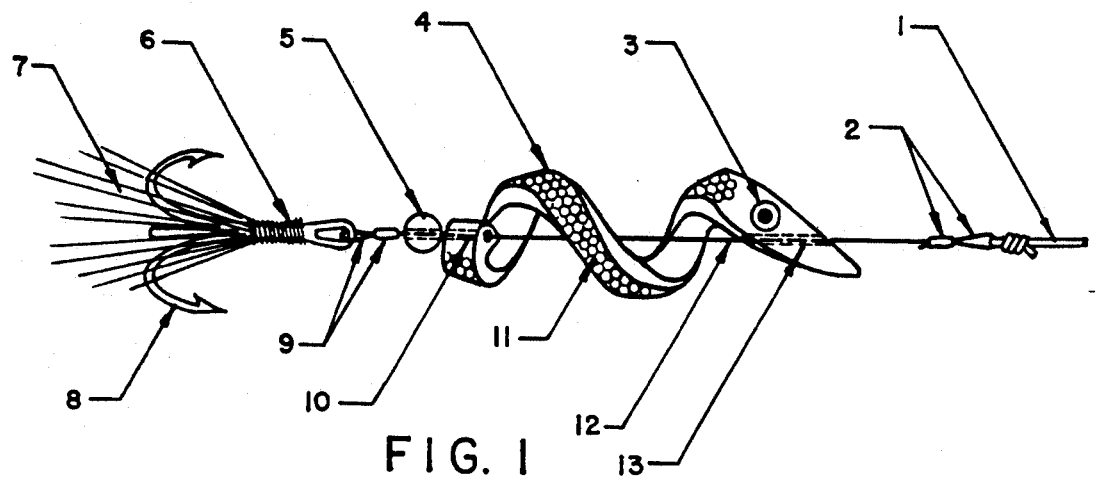
FIG. 1 is a side elevational view of my helical type spinning lure constructed in accordance with my new lure. This figure shows the lure assembly without the optional lead bullet weight.

Referring now to FIG. 1, one embodiment of my invention is shown in which a commercially available braided strand stainless steel wire lanyard 12 has a line attaching loop 2 at the fore end, and a hook attaching loop 9 at the aft end. These loops are permanent parts of the assembly and are formed by folding the wire back unto itself and securing same with a bronze crimp sleeve, the inside diameter of which is made to accomodate two diameters of the wire. Rotatably mounted on the lanyard 12 is a plastic helical spinner body 4. Displacably mounted on the lanyard 12 is a colored glass bead 5 which acts as a bearing against which the spinner body 4 spins against. The helical spinner body 4 has a fore hub 13 and an aft hub 10 through which the spinner body 4 is disposed onto the wire lanyard 12. These hubs being apertures 13 (FIG. 2) through the narrow dimension of the plastic material coincident with the longitudinal centerline after the body is formed. The spinner body 4 is rigid and self supporting in form between the two hub points.

Any amount of helical turns can be formed into the spinner body 4, this view FIG. 1 shows the body 4 as twisted through 720 degrees. Also, the pitch of the spinner body may be varied upon fabrication.

Figure 5:
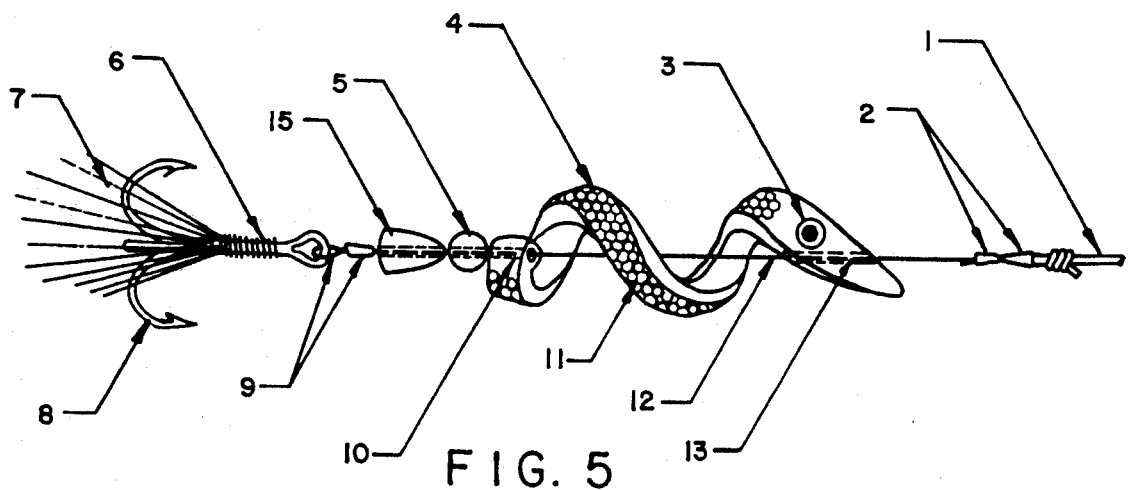
FIG. 5 is a side elevational view of my helical type spinning lure constructed in accordance with my new lure. This figure shows the lure assembly with the optional lead bullet weight in place.

The angler may select a supplementally weighted lure as shown in FIG. 5 for use in salt water or waters with a swift current. A lead bullet weight 15 is displacably mounted on the wire lanyard between the hook and bearing bead and is a permanent member of the assembly.

The wide dimension of the spinner body 4 may be decorated with commercially available prism tape 11 and stick-on eyes 3 that have a colored iris and black pupil. Alternatively, metalic glitter can be molded directly into the plastic body to achieve the same effect.

A commercially available treble hook 8 may be decorated with buck tail hair and hen feathers 7 and sealed with silk thread wrap 6 to camouflage the hook. The hook 8 size and the size of spinning body 4 are commensurate with the game fish being sought.

Figure 2:
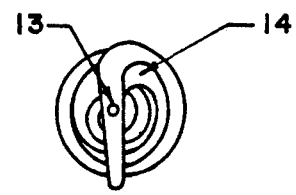
FIG. 2 shows a front elevational view along the longitudinal centerline which runs into and out of the paper thereby also showing how the aft and fore ends of the spinner body are centered on the axis of rotation.
Figure 3:
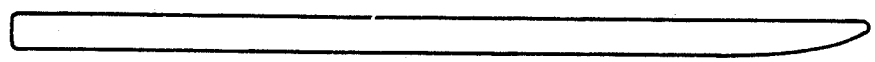
FIG. 3 is a side elevational view of the template of the present lure body before it is formed into the helix shape. This dimension of the body will hereinafter be referred to as the wide dimension.
Figure 4:
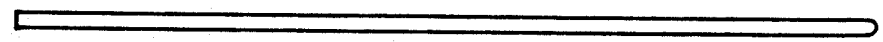
FIG. 4 is a top plan view of the template of the present lure body before it is formed into the helix shape. This dimension of the body will hereinafter be referred to as the narrow dimension.

A particular surface 14 of the spinner body 4 as shown in FIG. 2 is created by twisting the rectangular cross-sectioned template into the helical shape, resulting in a volute which causes water resistive forces that propel the spinner body 4 to gyrate around the wire lanyard 12.

What I claim is:

1. A fishing lure comprising:
    a flexible lanyard having a line attaching loop at a fore end and a hook connected at an aft end;
    a helical spinner body formed by a strip of rigid material having a front end and a rear end, and having a generally rectangular cross-sectional configuraiotn with opposed sides and intervening edges, wherein said edges are considerably narrower than said sides; said spinner body being rotatably and displaceably disposed on said layard by said lanyard passing thorugh the narrow edges at the front and at the rear ends of the body; and
    a bead freely displacable on the lanyard and mounted between the rear end of the spinner body and the hook.

2. A fishing lure as defined in claim 1 in which the flexible lanyard is formed of stainless steel wire.

3. A fishing lure as defined in claim 1 in which a hub is formed on the rear end of the body; and in which said lanyard passes through said hub.

4. A fishing lure as defined in claim 1 in which a lead weight is mounted on the lanyard beween the hook and bead.

* * * * *